May 1, 1973 P. POINTU ET AL 3,730,696
METHOD AND APPARATUS FOR GAS PHASE ION INTERCHANGE IN SOLIDS
Filed Dec. 5, 1968 4 Sheets-Sheet 1
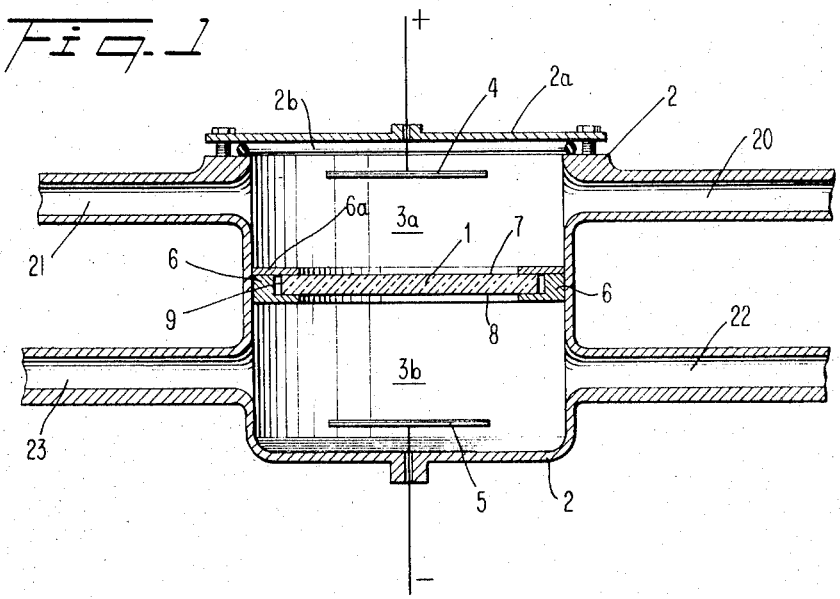
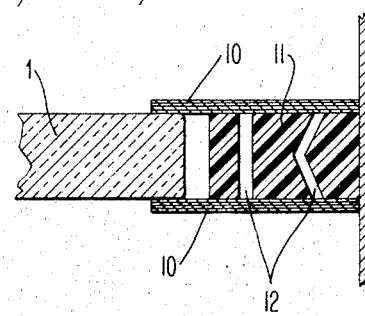
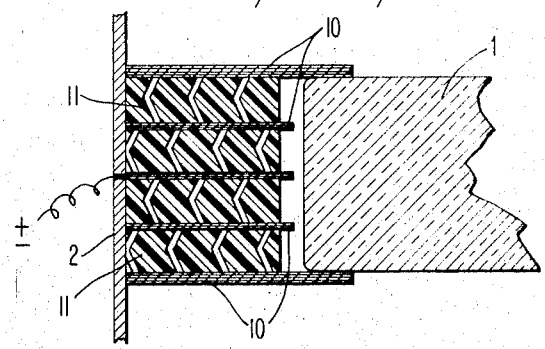
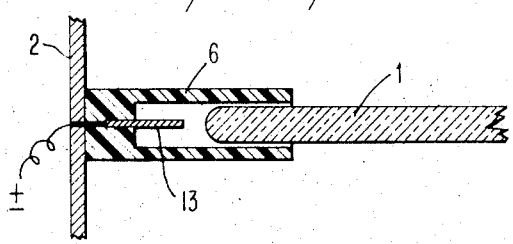
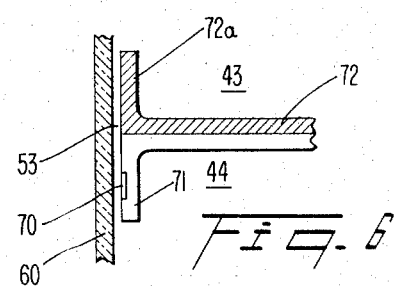
INVENTOR.
PIERRE POINTU
BY Bauer and Seymour
ATTORNEYS

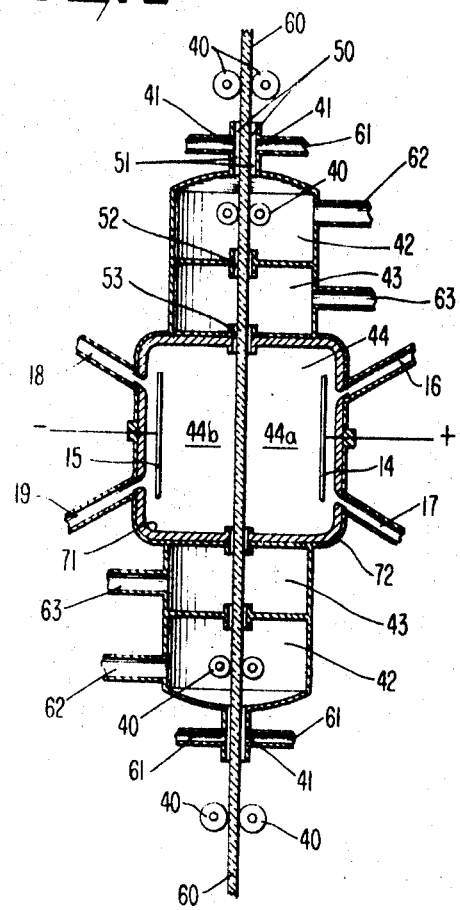
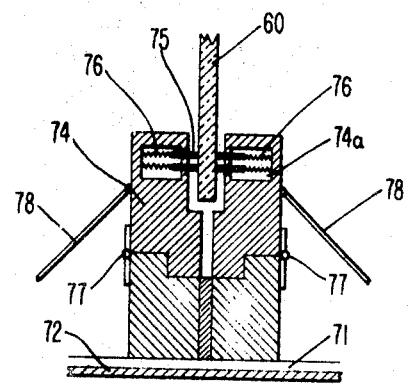

May 1, 1973  P. POINTU ET AL  3,730,696
METHOD AND APPARATUS FOR GAS PHASE ION INTERCHANGE IN SOLIDS
Filed Dec. 5, 1968  4 Sheets-Sheet 3

INVENTOR.
PIERRE POINTU
BY
Bauer and Seymour
ATTORNEYS

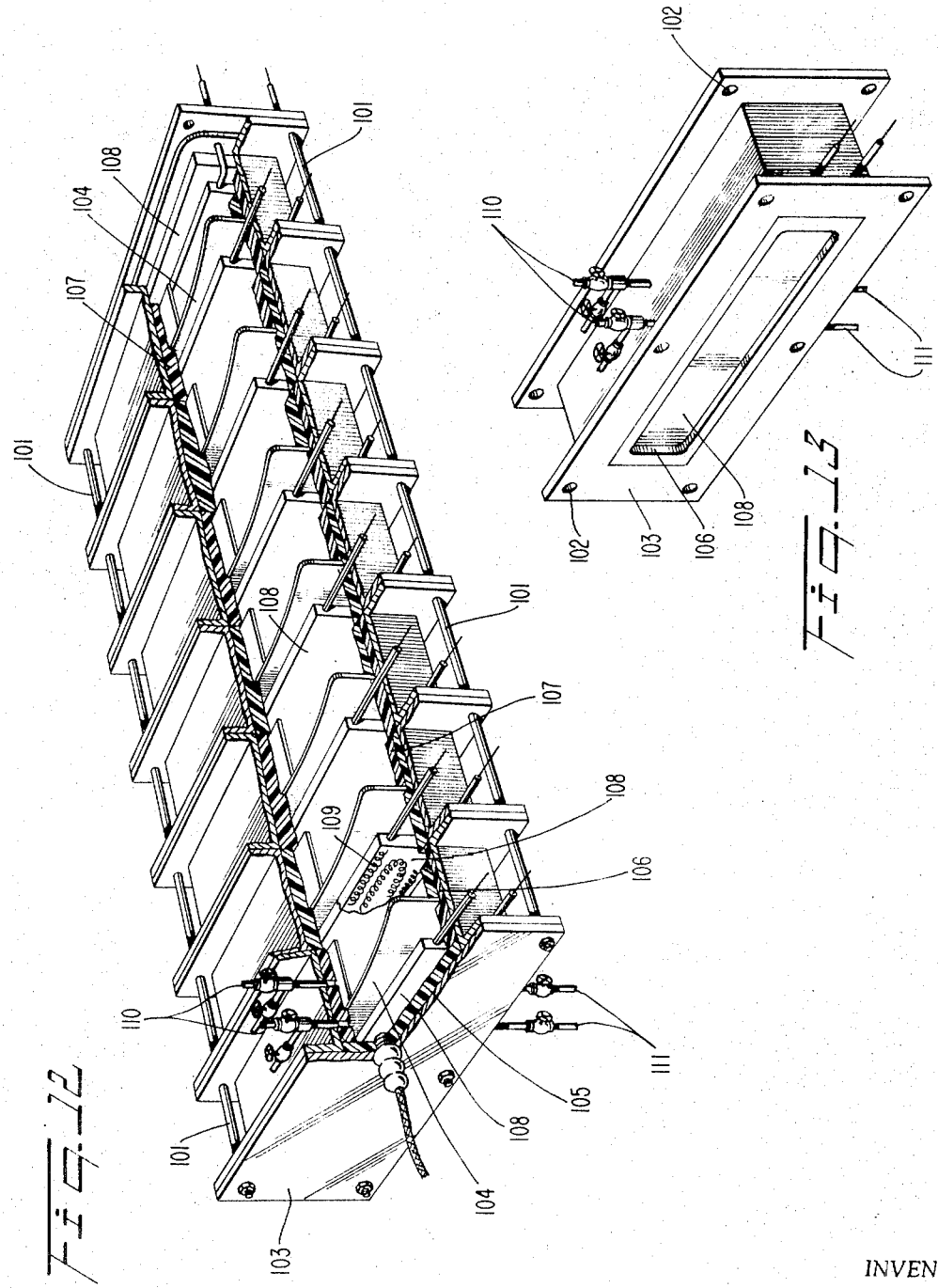

United States Patent Office 3,730,696
Patented May 1, 1973

3,730,696
METHOD AND APPARATUS FOR GAS PHASE ION INTERCHANGE IN SOLIDS
Pierre Pointu and Tran Thach Lan, Paris, France, assignors to Compagnie de Saint-Gobain, Neuilly-sur-Seine, France
Filed Dec. 5, 1968, Ser. No. 781,369
Claims priority, application France, Dec. 5, 1967, 130,982
Int. Cl. C23c *11/00;* C03c *11/00, 21/00*
U.S. Cl. 65—30                           13 Claims

ABSTRACT OF THE DISCLOSURE

An electrical field is passed through a solid body carrying with it ions from a gas in contact with the body which displace and replace ions in the body. The process is particularly useful in strengthening and coloring glass by displacing elements such as sodium and replacing them with elements such as potassium and copper.

---

This invention relates to the interchange of ions in a solid, has particular relation to ion interchange in glass, and will be described in that application. The invention includes novel processes, novel apparatus, and novel products of the process. The method is particularly suited to the ionic tempering of flat glass either continuously or in plates, and for purposes of illustration the description will involve the replacement of sodium atoms by potassium atoms without limiting the generality of the invention.

The invention is applicable to ion exchange between any material which has the property of ionic conduction and an ionized gas, the ion exchange being carried out by establishing an electric potential gradient between the two faces of the body which is to undergo ion interchange. According to one characteristic of the invention, using the ion interchange in a glass sheet as an example, one of the faces of the sheet is put in contact with the gaseous atmosphere of a first chamber which includes the gas phase ions which are to be introduced into the sheet, the second face of the sheet being in contact with a gaseous atmosphere, and preferably, but not necessarily, within another chamber, an electrical field which passes through the glass being established on opposite sides of the sheet by means of electrodes, the difference in potential of the electrodes being sufficient to assure the penetration of the ions into the face of the sheet. In a preferred form of the invention the sheet constitutes a wall separating the two chambers but the joint between the sheet and the walls of the chambers is permeable to gases but impermeable to ions so that gases may flow from one side of the sheet to the other but ions may not.

According to another characteristic of the invention, each chamber is equipped with means which allow the circulation of a gas or any mixture of gases which forwards the reaction. One of the chambers will be supplied with a gaseous mixture containing the ions which are to displace ions of the sheet and a positively charged electrode to impel those ions into the sheet. The chamber on the other side of the sheet, called the second chamber, will normally be supplied with a gaseous mixture capable of removing the displaced ions which collect on the negative side of the sheet, and will contain a negative electrode. The ionization of the gas in the first chamber is produced by an electric field established by the electrodes and passing through the sheet. On the other hand, an arrangement of electrodes is of value in many circumstances in which the ionization is carried out by electrodes other than those which create the electric field.

For purposes of simplicity the following description will be understood to apply to the particular case of the tempering of a sheet of silica-soda-lime glass in which electric conductivity is essentially ionic and due to the migration of sodium+ ions. Some of the examples contemplate particular cases in which the object has been to introduce potassium ions, which are positive, into the glass from the positive chamber while the opposite face of the glass is in contact with a gas under the influence of a negative electrode and which preferably includes ingredienst, such as hydrogen, which will remove the sodium ions which have been displaced from the negative face of the sheet.

The invention will be described in connection with the accompanying drawings, wherein like reference characters refer to like parts throughout the several views, FIG. 1 is a vertical sectional view through a cell for ion exchange according to the invention;

FIG. 2 is an enlarged vertical sectional view through a novel support for the sheet undergoing ion exchange;

FIG. 3 is a view, similar to that of FIG. 2, of a modification;

FIG. 4 is a similar view through a further modification;

FIG. 5 is a vertical, longitudinal, sectional view through apparatus for the continuous production of ion-exchange glass sheet;

FIG. 6 is a sectional detail of an ionizing barrier;

FIG. 7 is a vertical section through a form of novel edge support and ion barrier;

FIG. 8 is a vertical section through cell construction at the edge of the sheet undergoing ion exchange;

FIG. 9 is an advanced form of cell construction at the sheet edge in vertical section;

FIG. 10 is an advanced form of barrier construction in vertical section;

FIGS. 12 and 13 are perspective views, partly in section, of a commercial apparatus for use in exchanging ions in the surface of flat sheets such as automobile windshields.

Figure 11:
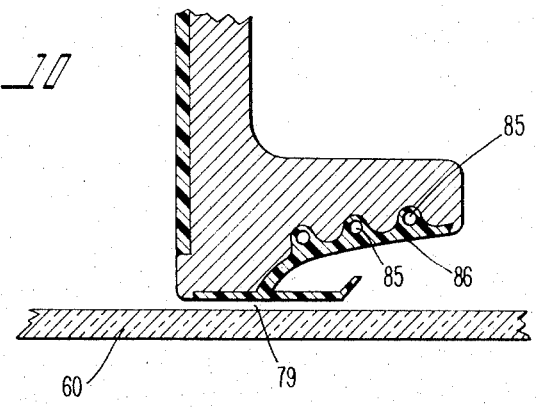
FIG. 11 is a vertical, diagrammatical view, partly in section of an advanced form of cell in which ionization and potential difference are accomplished by different circuits.
Figure 11:
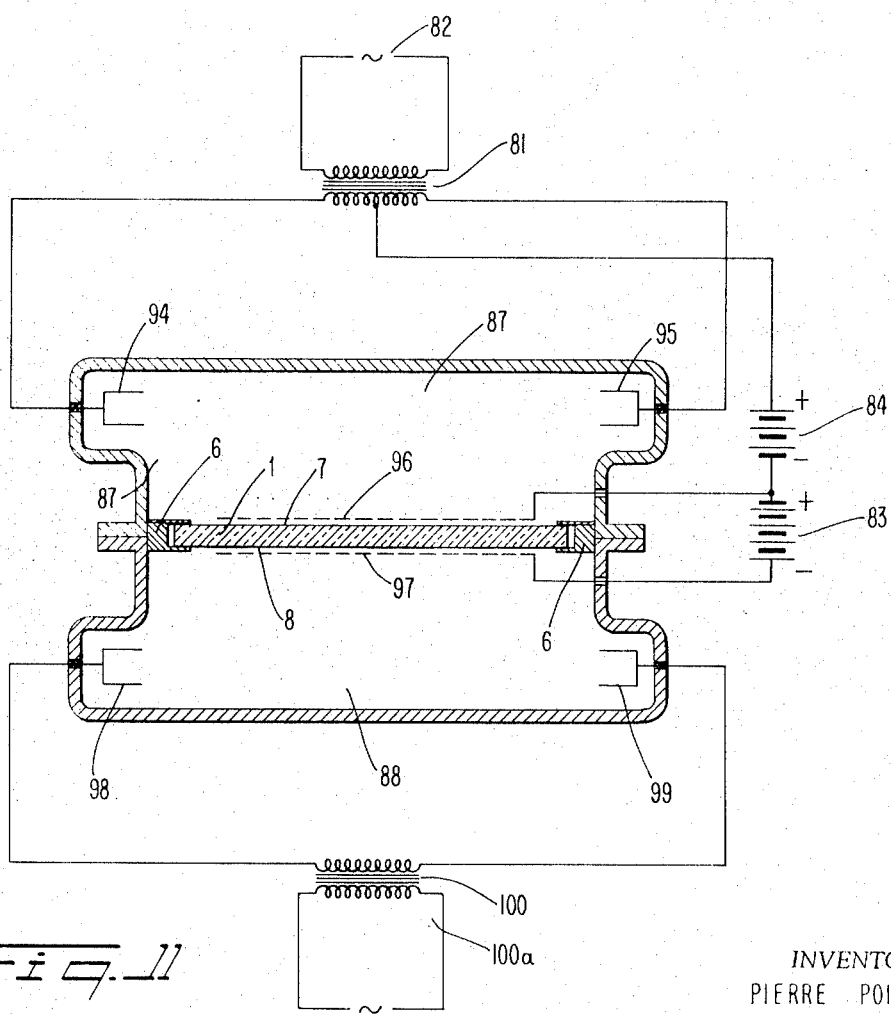

Generally speaking, the process contemplates the following steps:

The ionization of a gas to produce positive ions of the element which is to be introduced into the material to be treated when the latter is a positive ionic conductor or of negative ions of the element to be introduced when the material to be treated is a negative ionic conductor;

The ionized gas is in contact with the body to be treated, in this case a sheet of glass, which serves to separate the two chambers of which one contains the ionized gas and the impelling electrode and the other contains the other electrode;

A potential gradient is established between the two gaseous atmospheres which contact the opposite faces of the body which establish a potential gradient between the two faces of the sheet, it being observed that the face on the side of the positive electrode is carried at a negative potential with respect thereto, whereas the face of the sheet on the side of the negative electrode will have a potential positive with respect to the negative electrode.

In many cases it is advisable to remove the deposit which forms on the untreated face of the sheet which is built up by the ions which have been displaced during the exchange.

The term ionized gas as used in this specification includes an atmosphere containing an excess of particles of a given sign, or an atmosphere containing only particles of one sign, or a neutral plasma which contains approximately the same quantity of positive and negative particles computed as electric charges.

Apparatus for ionizing gas and apparatus for generating a beam of charged particles are described in the literature and need not be described herein. All such means are useful in principle in this invention but it is industrially advantageous to use the simpler methods, in particular the ionization by electric discharge by D.C. or A.C. and of high or low frequency. The examples which follow can be carried out by such methods and apparatus.

In choosing the gas which is to be used for the ion exchange, the following guides will be found valuable, it being noted that this part of the disclosure will be sufficiently complete if it is limited to the introduction of positive ions into a sheet of glass.

The gas should fill the anode compartment, the ions which are to be introduced into the glass should be present, or should be produced in situ, in substantial amount. The ion which is to penetrate the solid and replace an element thereof should be the principal carrier of the ionic current. The other gaseous substances which are present in the positive chamber, even though some of them ionize, should not react unfavorably with the surface of the material undergoing treatment or with the walls of the enclosure. The first of these conditions can be achieved at pressures ranging from about $10^{-4}$ mm. of mercury to several atmospheres and the most favorable pressure should be chosen for a particular operation. For instance, in the replacement of sodium by potassium in glass, low pressures are advisable. The second of these conditions, in which the ionic current should contain a preponderance of the exchange ion, shows that it is advantageous to choose a gas in which the number of the mobility of that ion has a high value. It is very difficult to give a general rule for the gas which is to be used in a particular ionic interchange considering the different types of body and of ions which can be involved but our experience has shown that the following conditions serve as a reasonable complete guide.

A gas or vapor of the only element which is to be substituted is always useful whatever the mode of ionization; if the ion to be introduced is an alkali metal, which is frequently the case when glass is the object, almost any gas or vapor containing atoms of the alkali metal can be used, whether the atoms be combined or not, because of the low potential of ionization of the alkali metals; it is particularly advantageous to use a halogenide of the element which is to be introduced. There is no substantial difficulty in producing a satisfactory potential difference between the positive electrode and the positive face of the glass and the negative electrode and the negative face of the glass, the only caution being to avoid the use of a gas which will react chemically with the glass or the apparatus or which will deposit parasitic matter which will affect the operation of the apparatus. The following examples illustrate gases which may be used in the anode compartment; if the material is a glass containing sodium alumino silicate in which all or a part of the ions of the outer layers are to be replaced by lithium, the exchange can be brought about by the use of lithium nitrate vapor ionized by electrical discharge, thus producing with ease a great quantity of lithium ions whereas the residue of the decompositions of lithium nitrate are eliminated in gaseous form without using chemicals on the glass. If the material to be treated is a silica-soda-lime glass and the object is to replace the sodium ions in the outer layers by potassium ions, the gas filling the anode compartment may be a vapor of metallic potassium under a pressure on the order of ½ mm. of mercury; whereas, if an inert gas such as argon containing metallic potassium is to be used, it may have a partial pressure of potassium of the same order. In these cases it is desirable that the glass sheet should be kept at a temperature of at least 350° C. at these low pressures in order to prevent the condensation of potassium vapor.

The invention is applicable not only to the strengthening of glass by the displacement of smaller by larger elements, such as the displacement of sodium by potassium, but to many other purposes such as the coloring of the surface of a silica-soda-lime glass, which can be carried out by introducing copper ions ionically, sodium ions being displaced, and the ionizing gas being cuprous chloride. The establishment of potential through the body of material which is undergoing treatment, for instance a glass plate, is readily established by establishing a sufficient difference of potential between the gaseous atmospheres in the anode and cathode compartments, utilizing appropriate electrodes for the purpose. It is indispensable that the ionic current pass through the sheet and to this end the two compartments must be electrically insulated from each other. It is not necessary that the compartments be hermetically insulated from each other. An important characteristics of the invention resides in the fact that this electrical isolation is accomplished without achieving a gas-tight seal between the anode and cathode compartments. It suffices to the good progress of the reaction to prevent an end run of the ions past the edges of the sheet, but the atoms constituting the gaseous atmospheres of the two compartments can be allowed to pass free. The fact that this process does not require a gas-tight seal between the compartments is of great advantage on the industrial scale. Furthermore, the ionic barrier which is to be established between the compartments is easily set up by causing the ions to discharge by recombination between themselves or by release of their charges against suitable surfaces such as walls. This can be thought of in terms of the shocks which the ions undergo by engagement with each other and the walls. According to this invention these shocks to which the ions are subjected are multiplied, insuring the rapid dissipation of their charges. It suffices to compose the joint, which separates the positive and negative chambers at the edges of the sheet, of materials having tortuous passages or minute canals or narrow clearance, materials having fine pores being especially effective. It is to be understood that the opposition offered to the passage of ions from one compartment to another can be increased by supplementary operations such as a reduction of pressure by a vacuum pump, blowing with a neutral gas, and polarizing by means of electrodes associated with the joint.

Hereinafter there are given several examples for purposes of illustration, together with a description of the figures of the drawings, it being understood that these particular examples do not impair the generality of what has been elsewhere herein stated.

EXAMPLE 1

FIG. 1 represents an apparatus for the exchange of ions in a sheet 1, in this case glass, by impelling ions against one face 7. This apparatus includes a chamber 2 of which the walls are made of electrically insulating material or of a conductive material which is revetted with insulation, the chamber being functionally insulating in either case. The upper part of the apparatus is closed by a cover 2a which is readily removable to permit the sheet 1 to be placed upon support 6. A joint 2b is provided to seal the enclosure and to permit the establishment of a vacuum through conduit 21 which is connected to a suitable aspirator. The chamber is divided by sheet 1 into compartments respectively the upper 3a and the lower 3b of which 3a is provided with a conduit 21 which permits the circulation of gas or vapor containing the element which is to be ionized and driven into the sheet. The lower compartment 3b is provided with conduits 22, 23 which allow the circulation of the same gas used in the upper compartment or another gas which should be neutral with respect to the body under treatment, for example nitrogen. This gas may contain a component to remove the sodium which appears on the negative side of the sheet, for instance hydrogen.

The compartments 3a and 3b contain electrodes 4 and 5 between which is applied the potential difference necessary to the establishment of an ionizing electric discharge and the creation of an electric field destined to favor the movement of positive ions toward the face 7 of the glass sheet. The whole of the apparatus is placed in a furnace, which is not shown, but which will maintain in the apparatus that temperature which is most favorable to the ionic interchange. As is apparent in the figure, the sheet is carried by a peripheral support 6 in which it can be fixed by a complementary ring 6a. A free space is left free between the edge of the sheet and the surrounding support but this is advantageously reduced to a practical minimum, for example 1 or 2 mm., while the faces 7 and 8 of the sheet are in contact with the supports 6 and 6a over a width of a few millimeters which defines a rim which does not undergo ionic interchange.

No particular precautions are necessary in mounting the sheet because the mount need not be gas tight. This support establishes a restricted passage between the two compartments, the size of which is sufficient to assure electric isolation, that is to say that it interrupts the discharge and initiates the dissipation of the ionic charge by contact with walls or recombination of the ions among themselves. The support 6 may be porous, or even pierced by holes when a free circulation of gas between compartments is desirable. The size of the holes should prevent discharge through them. For instance, if the gas pressure is about 0.1 mm. mercury, the support should have pores of which the average size in less than a few tenths of a millimeter. The support 6 may have several novel forms.

In the form of FIG. 2 it has a massive part 11 pierced by holes 12, straight or not, and the sheet of glass 1 is held by porous metal plates 10 having pores of the same size as the free movement of the ionized atoms at the given pressure. Under such conditions the ionized atoms cannot pass through the metal plates because of the large number of contacts with the metal, which causes recombination and limits passage to atoms and neutral molecules. One caution is to be observed, that when the body undergoing treatment is very thick, or when the treatment is applied to a body having low electric conductivity, the difference in potential should not be so high as to start a new ionic discharge inside the passages of the insulation. In such cases the insulation 11 should be subdivided in several layers and supplementary porous metallic plates should be put between the layers as in FIG. 3. The effect of this construction is to distribute the drop in potential between successive plates 10, in each case being less than the voltage required for discharge inside a passage.

When the pressure is low, e.g. $10^{-2}$ mm. mercury, a larger space can be left between support 6 and the edges of the sheet, as in FIG. 4, where the whole joint is in insulation while a metal piece 13, or metal inserts, offer sites of recombination to the ions by fractionating the potential gradient. The plate 13 and plate 10 of FIG. 3 may be connected to the source of current of the apparatus at a potential approximating the mean potential of the sheet undergoing treatment. This eliminates risks of unstable discharge and eliminates dangerous static charges before the plate is mounted for treatment.

EXAMPLE 2

In the preceding example, the apparatus was adapted to produce ion exchange within a sheet of glass cut to size in advance. The invention also applies to the treatment of one of the faces of a ribbon of similar material moving continuously through an ion interchange zone. The structure of the apparatus requires certain modifications which are made possible because the joint which assures the electrical isolation of the two compartments of opposite sign is not necessarily gas tight; consequently, the edges of the sheet can pass readily through the joint. An example of apparatus of this type is shown in FIG. 5 as applied to a ribbon of glass 60 which is moving vertically under the drive of rollers 40 and which is to be colored by copper or tempered by potassium. FIG. 5 represents a longitudinal section of such apparatus in which electrodes 14 and 15 are situated in compartments 44a, 44b respectively of an enclosure 72 for an insulating coat 71. These compartments communicate with conduits 16, 17 and 18, 19 which provide for the circulation of gas, as described for compartments 3a and 3b. Assuming that the treatment is to go forward under low pressure, less than atmospheric, the apertures 53 by which the ribbon enters or leaves the chambers 44a, 44b are encircled by a series of similar successive chambers in which pressures higher and higher are maintained until atmospheric is approached. In the drawing this has been limited to three successive chambers 43, 42, 41, it being understood that a larger number will be required if very low pressure is used in the ionizing chamber. Chambers 41, through which the ribbon passes after having negotiated the apertures 50, are maintained at a pressure slightly superior to atmospheric in order to prevent the entrance of air. This pressure is obtained by gas flow through conduit 61. On the contrary conduit 62 of chambers 42 are connected to a vacuum source such as a pump which can establish a pressure lower than atmospheric with the assistance of a calibrated aperture 51. In the same way there is created in chambers 43 through conduits 63 a yet lower pressure which is only slightly superior to that which is maintained in chambers 44a, 44b.

The active gas containing, for example potassium vapor, or a vaporized potassium compound, is introduced into the compartment 44a through conduit 16, being confined to the circuit 16, 44a, 17 without dispersing into the other chambers of the apparatus. The calibrated aperture 53 induces an effectual loss of pressure between chambers 43 and 44 but at the same time it interrupts the electric discharge by the effect described hereinabove and because the easily ionized potassium cannot enter the joint because it is rejected by the flow existing between chambers 43, 44a. Generally speaking, it is desirable to make the aperture 53 as small as possible.

FIG. 6 is a detailed view in larger scale of the aperture 53 with a particular construction according to which the auxiliary electrode 70, conveniently polarized, is inserted in the insulating portion 71 of chamber 44 while the aperture 53 is composed, toward chamber 43, of the prolongation 72a of the metal wall 72 of chamber 44. The function of electrodes 70 is to capture the ions or electrons which approach the aperture so as to extinguish the discharge. This auxiliary electrode enables one to use a larger aperture.

According to the variant of FIG. 7, the aperture is replaced by a longitudinal joint of the kind described in Example 1, a piece of insulating material 74 is provided with slots 74a into which the friction plate 75 can move. These plates are pressed against sheet 60 by springs 76. To facilitate the implacement of sheet 60 and to control the sheet, piece 74 is advantageously made in two pivoted parts which swing around axis 77 under the control of handles 78. The plates 75 may be constructed of electrically conductive material such as graphite, it being given that the length of chamber 44 depends upon the length of the treatment and the speed of the ribbon. This length may be important, in which case it becomes advisable to divide piece 75 into several overlapping segments.

In FIG. 8 is a view of a lateral joint which is constituted by apertures 79 leading into a chamber 80 which is itself connected to chamber 43. Chamber 80 may also be connected directly to a vacuum pump having a pressure less than that which would sustain the discharge. This arrangement is useful whenever the free main course of the ions of gas is superior to the dimensions of the aperture or whenever the sheet to be treated is very thick. This type of aperture, opening into the chamber in direct communication with the vacuum pump, inspires the particularly advantageous adaptation exemplified in FIG. 9; wherein the aperture 79 opens into chamber 90 connected to a vacuum conduit 89 and containing a potassium trap 91 composed of a cold plate cooled by circulation of liquid 91a upon which the vapor of potassium condenses. The temperature of that piece is maintained about 62.5° C. so as to condense the metal vapor and run it into the gutter 92 by which it flows to the receptacle 93, from which it evaporates to maintain the chosen pressure in the discharge chamber 44. It is useful to regulate the evaporation of the metal by controlling the temperature of the receptacle 93 by means cooling elements 93a, through which cooling fluid flows. Such a construction has the advantage of being simple and capable of being cleansed by a water spray whenever potassum is formed by the accidental introduction of water vapor. When metallic vapors which are easily condensed, alkali metals for example, are employed, the operation may be carried out with pressures substantially from $10^{-2}$ mm. of mercury in chamber 44 and attaining for example $8 \times 10^{-1}$ mm. by providing the aperture 79 with conical lips 86, as shown in FIG. 10, which are cooled by the circulation of fluid in canals 85. The metallic vapor condenses on the wall 86 and this establishes a reduction of supplementary pressure upstream of the lips, which improves the operation.

In the preceding examples the same electrical discharge which proceeds between the two electrodes through the sheet served both to establish the electrical field which oriented the ions and produced the ionization itself. Such apparatus has the advantage of simplicity but sometimes it is advantageous to carry out the ionization and establish the electrical field separately. In the following example the apparatus for ionization by electrical discharge is different from that which establishes the electrical field through the ribbon.

EXAMPLE 3

The apparatus is represented schematically in FIG. 11, on which it can be seen that the sheet 1 is held on supports 6 as in FIG. 1. Supposing that the body to be treated 1 is a sheet of glass in which it is desired that the upper face 7 should be penetrated by ions, this face is put in contact with the gaseous atmosphere, e.g. containing potassium, of upper compartment 87. The ionization of the gas in that compartment is produced by electrodes 94, 95 connected to the secondary of transformer 81, which is supplied with alternating current by generator 82. Near the surface of the sheet a perforated electrode 96 is connected to the positive pole of a battery 83 of which the negative pole is connected to perforated electrode 97 which is adjacent the glass in the cathode compartment 88. The midpoint of the transformer secondary 81 is connected to the positive pole of battery 84 of which the negative pole is connected to the positive pole of battery 83. The compartments 87 and 88 are connected to conduits which supply gas and vacuum. The vacuum sources are not represented on the drawing. Potassium vapor may thus be circulated through compartment 87 wherein it is ionized by the alternating discharge of electrodes 94 and 95. The potassium ions thus formed are entrained by the electric field and driven toward the electrode 96 which is at a negative potential compared to the average potential of electrodes 94, 95. Leaving the electrode 96, these positive ions are driven toward negative electrode 97 and pass into and through the glass sheet, upon the cathodic face 8 of which appears sodium ions which can be dissipated in the atmosphere of compartment 88 by including hydrogen in that atmosphere to form sodium hydride with the sodium, to be removed as in Example 1. In the compartment 88 electrodes 98, 99 are connected to the secondary of transformer 100 which is supplied with alternating current by generator 100a.

EXAMPLE 4

As stated above, one of the advantages of the invention resides in the fact that it is not necessary to hermetically seal the two compartments against each other, so that the wall which consitutes the body being treated may simply rest on an insulating joint which may or may not be porous. This makes loading and unloading easy. From the industrial viewpoint this makes it possible to assemble a large number of sheets to be treated in a single bank, for example as represented in FIGS. 12 and 13, which illustrate the treatment of windshields to impart superior mechanical properties, particularly strength. The apparatus is formed by an assembly of identical boxes, such as represented in FIG. 13. Each of these boxes receives a windshield 104 which is mounted substantially as indicated in FIG. 1. The whole apparatus is represented in perspective in FIG. 12 wherein the successive boxes are connected, after the mounting of the sheets, by rods 101 which pass through orifices 102 which are provided in flanges 103. FIG. 12 also shows the insulating lining which covers the internal walls of the boxes and which have shoulders 106 upon which the windshields are placed, being held in position by insulating retainers 107. Each box contains a plate electrode 108 of which the polarity is alternated from caisson to caisson. These plate electrodes can be heated by resistance elements 109. The internal space of each box is divided by the windshield 104 into anode and cathode compartments through which the requisite vapors are circulated through supply conduits 110 and exhaust conduits 111, of which the latter are connected to vacuum. This apparatus is used as follows: A difference in potential between the electrodes is 600 volts, the current density is 5 ma./cm.$^2$, the temperature of the whole unit is 400° C. The anode compartments are supplied with argon carrying potassium vapor, the pressure in each compartment is about 10 mm. of mercury. In the cathode compartments, hydrogen is circulated in order to form sodium hydride from the sodium which gathers on the cathode face of the glass. After 30 minutes of operation the sodium ions in the anodic face of the windshield are replaced by potassium ions to a depth of 80 to 100 microns.

If it is desired to strengthen both faces of the windshield, the polarity of the electrodes is reversed and the gases flowing to the different compartments are reversed by appropriate transfer of the inlet and outlet conduits. After 20 minutes it will be found that each side of the windshield will have a substitution layer of about 60 microns thickness.

In the foregoing description the apparatus has been described as a chamber divided in two to make anode and cathode compartments or as being composed of an anode and a cathode compartment. But in many cases the second compartment such as 3b of FIG. 1 or 88 of FIG. 11 may be omitted, the second electrode 5 or 97, respectively, being put into direct contact with the second face of the body.

The operation is to a certain extent like an electrolysis and it does not depend upon the position of the ions in the electromotive series. The ions follow the electric field according to their sign. For instance, anodic gas ions replace positive glass ions; furthermore, most of the gas ions are monovalent; on the other hand, the movable ions in glass or ceramics are essentially metallic ions (network modifier), principally the small monovalent ones: $H^+$, $Li^+$, $Na^+$, $K^+$, $Ag^+$; larger ions have a more superficial and more difficult action: $Mg^+$, $Ba^+$, $Fe^+$.

Negative ions from the cathodic compartment can be used but they are difficult to create because ionization of gases usually occurs through loss of electrons.

Introducing the ionizable substance normally requires use of a gas ($H_2$, $O_2$), or vapors of a metal (Na, K) or a salt LiCl, AgCl, $CuCl_2$, $FeCl_3$). The pressure will often be low. The temperature must be sufficient to allow ionic conductivity in the treated substance. It does not need to be the boiling temperature of the salt, but only a temperature at which the partial pressure is sufficient.

Among the uses of the process are removing sodium from the outer layers to toughen glass and modify its chemical properties by the introduction of hydrogen ions; toughening glass by stuffing it with larger ions while displacing smaller such as sodium ions. This will modify the expansion coefficient; Preliminary treatment with smaller ions such as lithium at relatively high temperature before toughening with ions such as sodium or potassium; Coloration is carried out with ions such as silver, copper and iron.

An advantage of the invention is the gas phase exchange of ions in a solid body having ionic conductivity. The process and the apparatus are of relatively simple construction and operation. A major advantage of the apparatus, which favorably affects the process, is that no gasket is necessary between compartments. Another important phase of the process is that one of the faces of the sheet is in contact with an anodic ionized atmosphere and the other face with a cathodic ionized atmosphere, the edges of the sheet being ionically sealed and an electric field created by electrodes being used to drive the ions into the sheet. Another important feature is the use of an electric field which extends through the sheet into two chambers to interchange ions in the sheet.

The process is essentially dry and, being in gas phase, is subject to accurate control as to concentrations of ions and current.

As many apparently widely different embodiments of the present invention may be made without departing from the spirit and scope thereof, it is to be understood that the invention is not limited to the specific embodiments.

What is claimed is:

1. Apparatus for introducing ions into a body of an ionically conductive solid such as glass or ceramic, comprising a first enclosure, means to introduce into said first enclosure a gas containing ions to be introduced into said body, a second enclosure containing a gaseous atmosphere, support means to hold between the said enclosures the body to be treated in contact with the two atmospheres of the enclosures, an ionizing electrode in each enclosure, means to pass the ionizing field from electrode to electrode through the body, means to admit gas containing an ionizable replacement element to one of the chambers, and means associated with the support means to limit ionic flow of the body.

2. In combination with the apparatus of claim 1 each chamber comprising a bell, means to pass a flat body between the bells and through the ionizing field, and means to establish within the field conditions of temperature, pressure, and difference of potential favorable to ion exchange.

3. In combination with the apparatus of claim 2 means to evacuate at least one chamber.

4. The apparatus of claim 1 in which the support means comprises alternate metal and non-conductive layers of which the metal is permeable to gas, but of which the passages which make it permeable act to recombine ions, and of which a non-conductive layer is provided with holes in contact with the permeable metal.

5. Apparatus for introducing ions into flat glass ribbon and the like which comprises a chamber through which the ribbon passes a septum dividing the chamber into parts, means in the parts to pass ions into the ribbon, said chamber having slots of ingress and egress for the ribbon and slots for the edges of the ribbon, the slots for the edges of the ribbon comprising physical means permitting the passage of gas from one part of the chamber to the other and for recombining ions as they flow past the edge.

6. Apparatus according to claim 5 in which electrically conductive slides engage the glass in the slots.

7. Apparatus according to claim 5 in which the slots are in a secondary chamber and the secondary chamber is connected to vacuum means.

8. Apparatus according to claim 7 in which the secondary chamber contains means to condense potassium vapor and means to conduct the condensate to the ionization chamber, and the ionization chamber contains a receptacle for the molten potassium and means to heat the receptacle.

9. Apparatus per claim 5 in which a slot is provided with conical facings and the facings are provided with cooling means.

10. Apparatus for the replacement of ions in glass comprising means to move a ribbon of flat glass along a course, a housing enclosing a part of the ribbon, said housing including an ionizing chamber which is partitioned by the glass, means to fill each part of the ionizing chamber with an ionizable gas, a series of chambers of progressively altered pressure preceding the ionizing chamber and similar chambers following it, means in one part of the ionizing chamber to ionize a gas comprising elements adapted as ions to displace ions in the glass and to pass the ions into the glass, means in the other part of the ionizing chamber to remove expelled ions from the surface of the glass, means to establish in the ionizing chamber conditions of temperature, pressure, and potential difference favorable to ion exchange, and walls closely approaching the glass between the several chambers and forming small apertures through which the ribbon passes, said apparatus including a plate, having a potential of sign and magnitude sufficient to recombine ions, associated with an aperture and the glass passing therethrough.

11. A gas phase method of exchanging ions in an ionically conductive solid containing displaceable ions which comprises putting gases in contact with opposite faces of the solid, the gas on one side containing displacement ions capable of displacing ions of the solid under the impulse of an electrical field, establishing an electrical field through the gases and the solid with polarity and potential difference sufficient to displace ions in the solid by those of the gas, limiting the field to passage through the solid, maintaining a temperature which is favorable to the ion exchange, and removing displaced ions from the negative face of the solid.

12. A method according to claim 11 including the step of removing the displaced ions from the face of the plate opposite to the face in contact with the ionized atmosphere.

13. Apparatus for the improvement of glass sheet by ion exchange consisting of a multiplicity of units of which each unit comprises a box, in the box an insulating support for the sheet impermeable to ions, electrodes of opposite sign on opposite sides of the glass sheet, means for flowing gas on one side and means for flowing gas on the opposite side of the sheet, heating means effective to heat the sheet, means to evacuate, the box, and means to establish a difference of potential between the electrodes adequate to the exchange of ions of the gas for ions of the glass, including means to flow into the cathodic side of the box, a gas capable of reacting with the ion expelled from the glass.

References Cited

UNITED STATES PATENTS

| | | | |
|---|---|---|---|
| 2,526,012 | 10/1950 | Feldmeier | 118—48 X |
| 3,212,922 | 10/1965 | Sirtl | 117—106 |
| 3,348,934 | 10/1967 | Hinson et al. | 65—30 X |
| 3,469,560 | 9/1969 | Bukkila et al. | 117—106 X |
| 3,467,508 | 9/1969 | Loukes et al. | 65—30 |
| 3,505,047 | 4/1970 | Plumat | 65—30 |
| 3,505,049 | 4/1970 | Plumat | 65—30 |
| 3,506,422 | 4/1970 | Walters | 65—25 |
| 3,645,710 | 2/1972 | Plumat et al. | 65—30 |
| 3,531,319 | 9/1970 | Martorana | 118—48 X |

ROBERT L. LINDSAY, JR., Primary Examiner

U.S. Cl. X.R.

65—118; 117—106; 118—49.1, 49.5, 638